(12) United States Patent
Provenzano et al.

(10) Patent No.: US 7,654,405 B2
(45) Date of Patent: Feb. 2, 2010

(54) METHOD AND SYSTEM OF A DETACHABLE NOSE FACEPLATE

(75) Inventors: Charles J. Provenzano, Houston, TX (US); Michael Leung, Missouri City, TX (US)

(73) Assignee: Direct Connect, Houston, TX (US)

( * ) Notice: Subject to any disclaimer, the term of this patent is extended or adjusted under 35 U.S.C. 154(b) by 403 days.

(21) Appl. No.: 11/550,028

(22) Filed: Oct. 17, 2006

(65) Prior Publication Data

US 2008/0110886 A1 May 15, 2008

(51) Int. Cl.
*H02G 3/14* (2006.01)
*B65D 45/16* (2006.01)
*H02G 3/08* (2006.01)
*F16L 5/00* (2006.01)
*H05K 5/03* (2006.01)
*H01B 17/26* (2006.01)
*H01B 17/30* (2006.01)
*H01R 9/16* (2006.01)

(52) U.S. Cl. .................. 220/241; 220/242; 220/324; 220/3.3; 220/3.7; 248/56; 248/57; 174/151; 174/153 R; 174/66; 174/67

(58) Field of Classification Search .......... 220/242, 220/241, 786, 3.3, 3.7; 248/56, 57; 174/151, 174/153 R, 66, 67
See application file for complete search history.

(56) References Cited

U.S. PATENT DOCUMENTS

| 2,716,225 | A | * | 8/1955 | McCubbin | 439/314 |
|---|---|---|---|---|---|
| 2,987,690 | A | * | 6/1961 | Marbais | 439/135 |
| D283,221 | S | * | 4/1986 | West | D13/156 |
| 4,688,747 | A | * | 8/1987 | Helmsdorfer et al. | 248/56 |
| D502,386 | S | * | 3/2005 | Provenzano et al. | D8/350 |
| 7,390,964 | B2 | | 6/2008 | Gorin | |
| 7,399,920 | B2 | | 7/2008 | Gorin | |

* cited by examiner

*Primary Examiner*—Anthony Stashick
*Assistant Examiner*—Andrew T Kirsch
(74) *Attorney, Agent, or Firm*—Mark E. Scott; Conley Rose, P.C.

(57) ABSTRACT

Method and system of a detachable nose faceplate. At least some of the illustrative embodiments are methods including orientating a faceplate having an aperture therein, orientating a detachable nose in one of a plurality of possible orientations, aligning the detachable nose with the faceplate, and attaching the detachable nose to the faceplate.

27 Claims, 4 Drawing Sheets

METHOD AND SYSTEM OF A DETACHABLE NOSE FACEPLATE

BACKGROUND

Embedding electrical and audio visual wire and cables within a wall is a practice of installers. To get the wiring or cabling into the wall a hole must be cut in the sheetrock. The hole creates an eye sore which installers cover with faceplates. Faceplates are manufactured in various shapes, sizes, and colors, with each faceplate molded into a single configuration. Frequently, installers have an installation project where they need to cover the hole in the wall while still enabling the wire or cables to pass through. This limitation requires installers to keep in stock single configuration faceplate inventory so that the proper faceplate will be on hand, which inventory requirement is inconvenient and incurs additionally cost for the installer.

BRIEF DESCRIPTION OF THE DRAWINGS

For a detailed description of exemplary embodiments, reference will now be made to the accompanying drawings in which.

DETAILED DESCRIPTION

When reading this section which describes exemplary embodiments, one should keep in mind several points. First, the following exemplary embodiments are what the inventor believes to be the best mode for practicing the invention at the time this patent was filed. Thus, since one of ordinary skill in the art may recognize from the following exemplary embodiments that substantially equivalent structures or substantially equivalent acts may be used to achieve the same results in exactly the same way, or to achieve the same results in a not dissimilar way, the following exemplary embodiments should not be interpreted as limiting the scope of just the embodiments described.

Second, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (e.g., one recognizes that "tacking" may be done by nailing, stapling, gluing, hot gunning, riveting, etc., and so a use of the word tacking invokes stapling, gluing, etc., and all other modes of that word and similar words, such as "attaching"). Fourth, unless explicitly stated otherwise, conjunctive words (such as "or", "and", "including", or "comprising" for example) should be interpreted in the inclusive, not the exclusive, sense.

Accordingly, the various embodiments can be characterized as detachable nose faceplate system, method and device. One embodiment is a system that has a faceplate with a removable nose portion that may be orientated in a plurality of configurations. Another embodiment is a method for orientating a detachable nose portion in a nose faceplate system. Yet another embodiment is a device that has a faceplate with a removable nose portion that may be orientated in a plurality of configurations each forming a passage enabling at least one wire to pass through.

Figure 1:
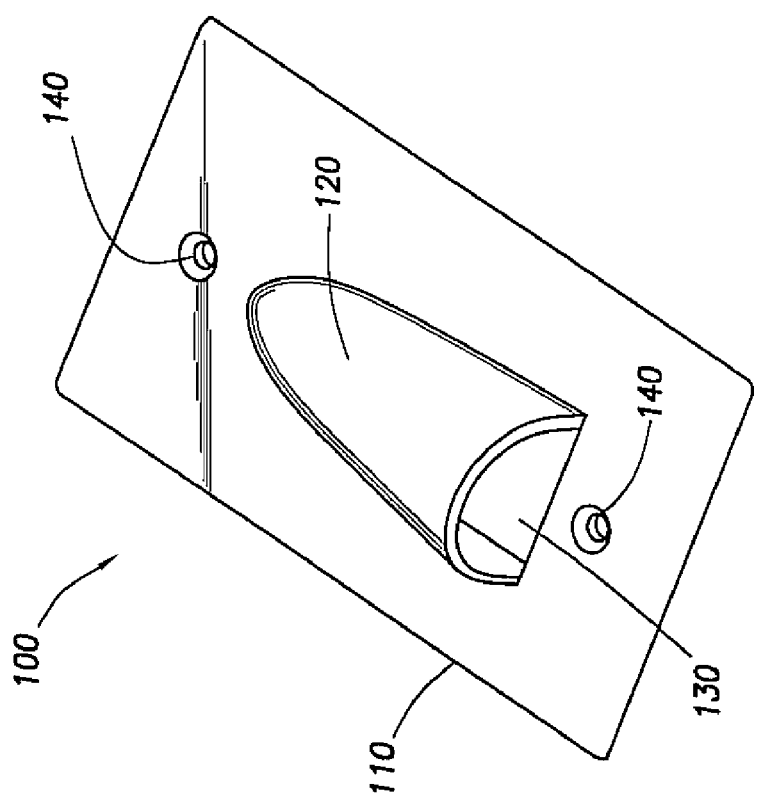
FIG. 1 illustrates a top view of a detachable nose faceplate system.

FIG. 1 illustrates a top view of a detachable nose faceplate system 100. The detachable nose faceplate system 100 comprises a faceplate 110 that removably attaches to a surface by way of at least one fastener. The faceplate 110 has or defines a front side and a back side, a nose aperture. A nose portion 120 has or defines a top side, a bottom side, a nose edge. The nose portion 120 attaches to the faceplate 110, and at least one passage 130 is formed proximate to the base of the nose aperture and the nose edge. In some embodiments, the faceplate 110 and nose portion 120 are made out of plastic and are identical in color. However, the faceplate 110 and nose portion 120 may be equivalently made in various shapes and sizes and made of various materials (e.g., alloy, wood, metal, plastic, urethane, or polyurethane). Furthermore, the faceplate 110 and nose portion 120 may each be made in various colors (e.g. black, white or beige). In some embodiments, the faceplate 110 removably attaches to a flat surface, such as a wall, pillar, entertainment center, office desk, or other piece of furniture. Alternatively, the faceplate 110 removably attaches to a rounded surface (e.g., a pole, cylindrical column, or cylindrical pillar).

In some embodiments, the faceplate 110 secures to a wall, or electrical box within the wall, through apertures 140 by a fastener, such as a screw. In alternative embodiments, the faceplate 110 may be secured to a wall or other surface by way of a bracket, clip, clamp, Velcro, double stick tape or other equivalent mechanisms.

Passage 130 is formed proximate to the intersection of the base most portion of the nose aperture and base most portion of the nose edge. In some embodiments, the passage 130 is semi-circular and substantially flute-like. In alternative embodiments, more than one passage 130 may be implemented in order to separate selected wires or cables that may pass through the passage 130. Examples of wires and cables that may pass through the passage 130 are audio cable, video cable, power cable, and network cable.

Figure 2:
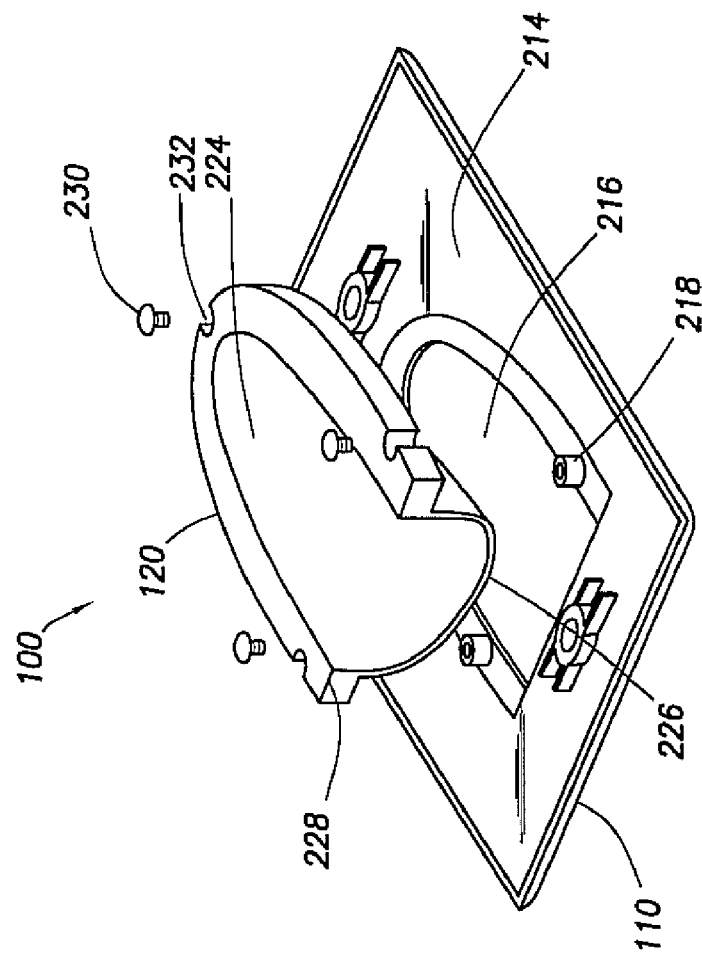
FIG. 2 illustrates an expanded bottom view of the detachable nose faceplate system.

FIG. 2 illustrates an expanded bottom view of the nose faceplate system 100 in accordance with some embodiments. The detachable nose portion faceplate system 100 comprises the faceplate 110 having a back side 214, a nose aperture 216, and at least one socket 218. The nose portion 120 further comprises a bottom side 224, a nose edge 226, a lip 228 and at least one fastener 230 that attaches at least a portion of the nose portion 120 to the faceplate 110. In some embodiments, the lip 228 outlines a portion of the bottom side 224 along the perimeter, which lip 228 removably attaches to a socket 218 integrally formed within the bottom side 224 of the faceplate 110, such as by fastener 230. Each fastener 230 may be a screw; however, in an alternative embodiment clips, brackets, clamps, or other fasteners may be equivalently used. Furthermore, the lip 228 may have pre-formed foramens 232 to assist aligning the nose portion 120 to the faceplate 110 and its respective sockets 218.

In some embodiments, the nose portion 120 may be configured to protrude from the faceplate 110 in a plurality of orientations, such as protruding in the direction of the top or front side of the faceplate 110 (as in FIG. 1), or protruding in the direction of the back side 214 of the faceplate 110 (as in FIG. 3 below). In other alternative embodiments the nose portion 120 may be flipped, rotated, turned, angled, or manipulated into a plurality of configurations. For example, in some alternative embodiments the nose portion 120 and corresponding nose aperture 216 may be more symmetrical in shape whereby when removably attached to the faceplate 210 may yield four configurations. The nose aperture 216 in some embodiments is arch-shaped.

Figure 3:
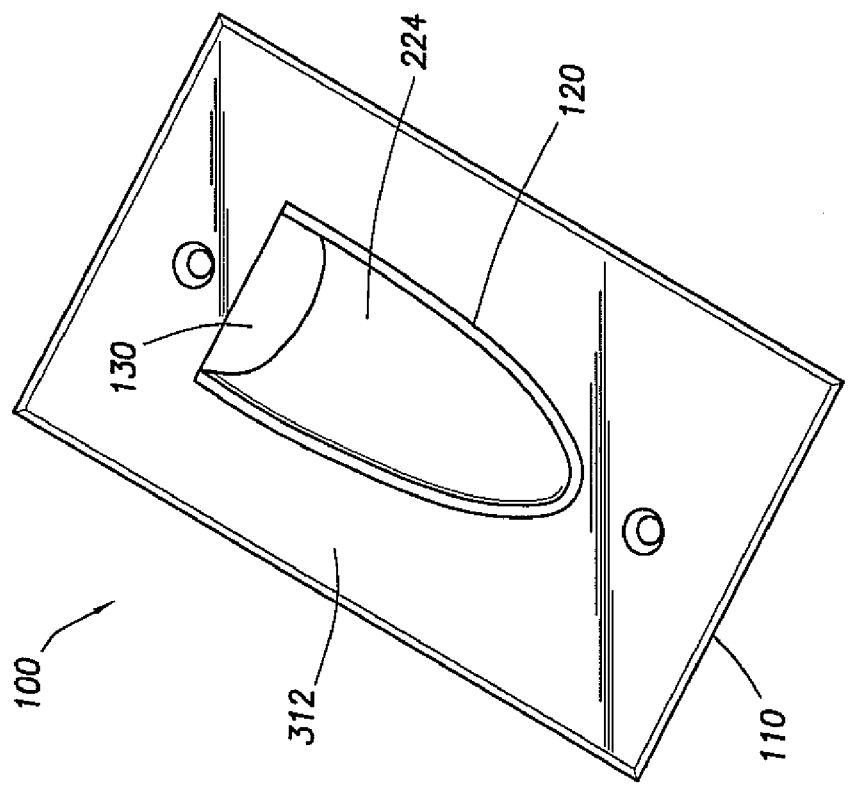
FIG. 3 illustrates a top view of a detachable nose faceplate system with the nose reversed.

FIG. 3 illustrates a top view of a detachable nose faceplate system 100 in which the nose portion 120 shown is protruding from the behind the faceplate 110. In this configuration the nose bottom-side 224 is aligned with the faceplate front side 312 and the passage 130 is behind the faceplate 110. The opposite configuration is illustrated in FIG. 1 whereby the nose portion 120 protrudes in the direction of the front side 312 of the face plate 110.

Figure 4:
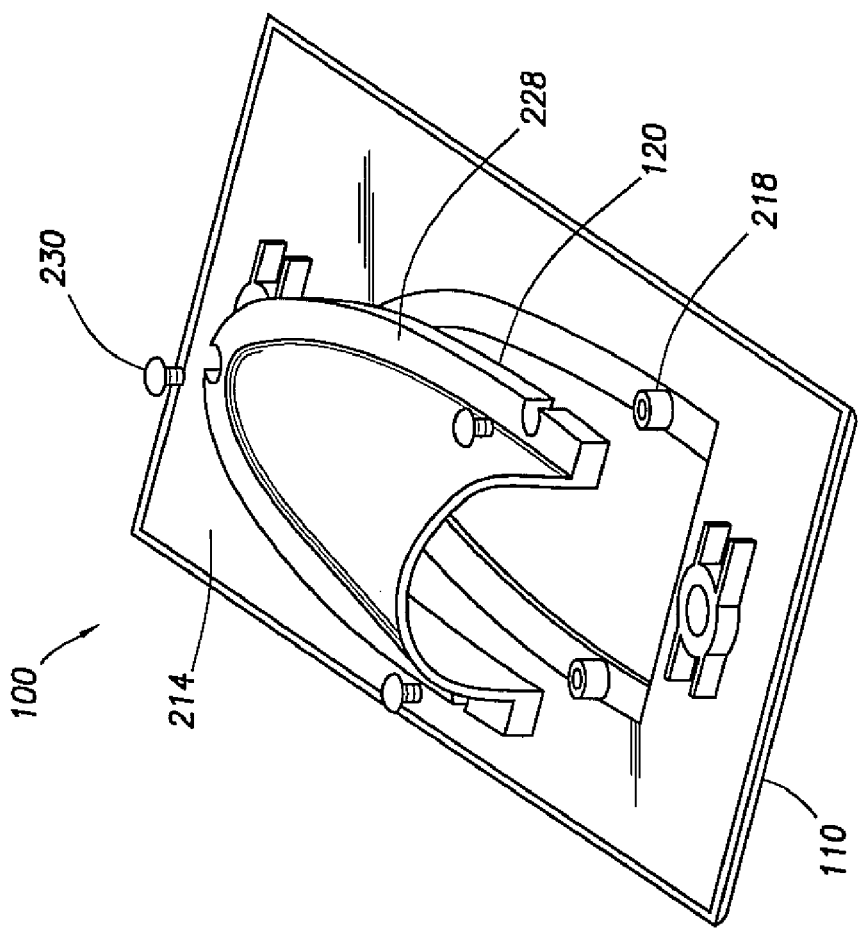
FIG. 4 illustrates an expanded bottom view of the detachable nose faceplate system with the nose reversed.

FIG. 4 illustrates an expanded bottom view of a detachable nose faceplate system 100 with the nose portion 120 protruding in the direction of the back side 214 of the faceplate 110. Similar to FIG. 2, the nose portion 120 by way of its lip 228 in its reversed configuration, removably attaches to the faceplate 110 by each socket 218 and a series of fasteners 230.

Figure 5:
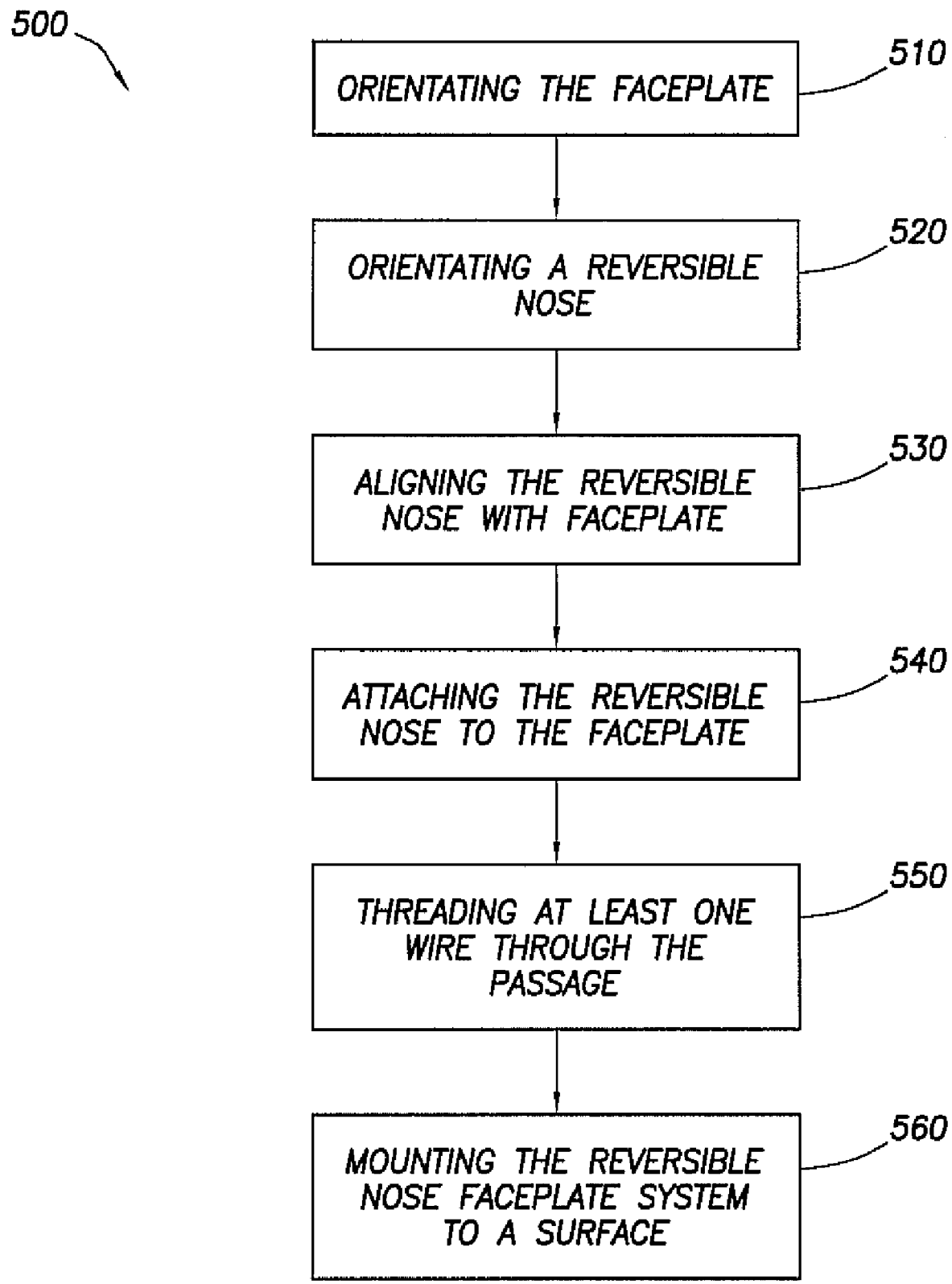
FIG. 5 shows a method for a detachable nose faceplate system.

FIG. 5 illustrates a method for a detachable nose faceplate system. While the illustrative method of FIG. 5 shows a particular order, the various steps may be equivalently combined, separated, or performed in a different order. The method 500 comprises orientating a faceplate 110 (block 510) having a nose aperture 216, orientating a nose portion 120 (block 520) in one of a plurality of possible orientations, aligning the nose portion 120 with the faceplate 110 (block 530), attaching the nose portion 120 to the faceplate 110 (block 540), threading wire (block 550), and mounting the faceplate 110 to a surface (block 560).

In some embodiments, orientating the nose portion (block 520) is the orienting such that the nose portion 120 protrudes in the direction of the front side 312 of the face plate 110. In alternative embodiments, orientating the nose portion 120 is orienting such that nose portion 120 protrudes in the direction of the backside 214 of the faceplate 110. Thus, orientating the nose portion 120 (block 520) comprises selecting one of multiple nose portion 120 configurations. As illustrated in the first four figures, the nose portion 120 has two possible configurations; however, multiple nose configurations may be used to accomplish the intended functions and methods.

Aligning the nose portion 120 and the faceplate 110 (block 530) comprises aligning a portion of the lip 228 of the nose portion 120 with at least one socket 218 of the faceplate 110. Attaching the nose portion 120 to the faceplate 110 (block 540) comprises removably attaching the lip 228 and at least one socket 218 securely together by way of a fastener 230. In some embodiments, the attaching of the nose portion 120 to the faceplate 110 (block 540) comprises removably attaching the lip 228 to three different sockets 218 integrally formed within the faceplate 110 using three fasteners 230.

Threading wire (block 550) comprises threading one or more wires, such as audio, video, or power cables, through the passage 130. In alternative embodiments, the wire may be threaded through the aperture 216 prior to attaching the nose portion 120 to the faceplate 110. These alternative embodiments may be beneficial when the wires or cables have connectors that are too large to fit through the passage 130. The wires may collectively originate from within the wall, are threaded through the passage 130, and are routed to their respective audio and video components. Alternatively, a network cable, for example, may originate from a personal computer, is threaded through the passage 130, and finally routed to a network access point. Lastly, mounting the reversible nose faceplate system 100 (block 560) comprises mounting the reversible nose faceplate system 100 to a surface by way of at least one fastener 230. In some embodiments, the detachable nose faceplate system 100 is mounted to a wall via two screws. Alternatively, the reversible nose faceplate system 100 may be mounted to a desk.

Figure 6:
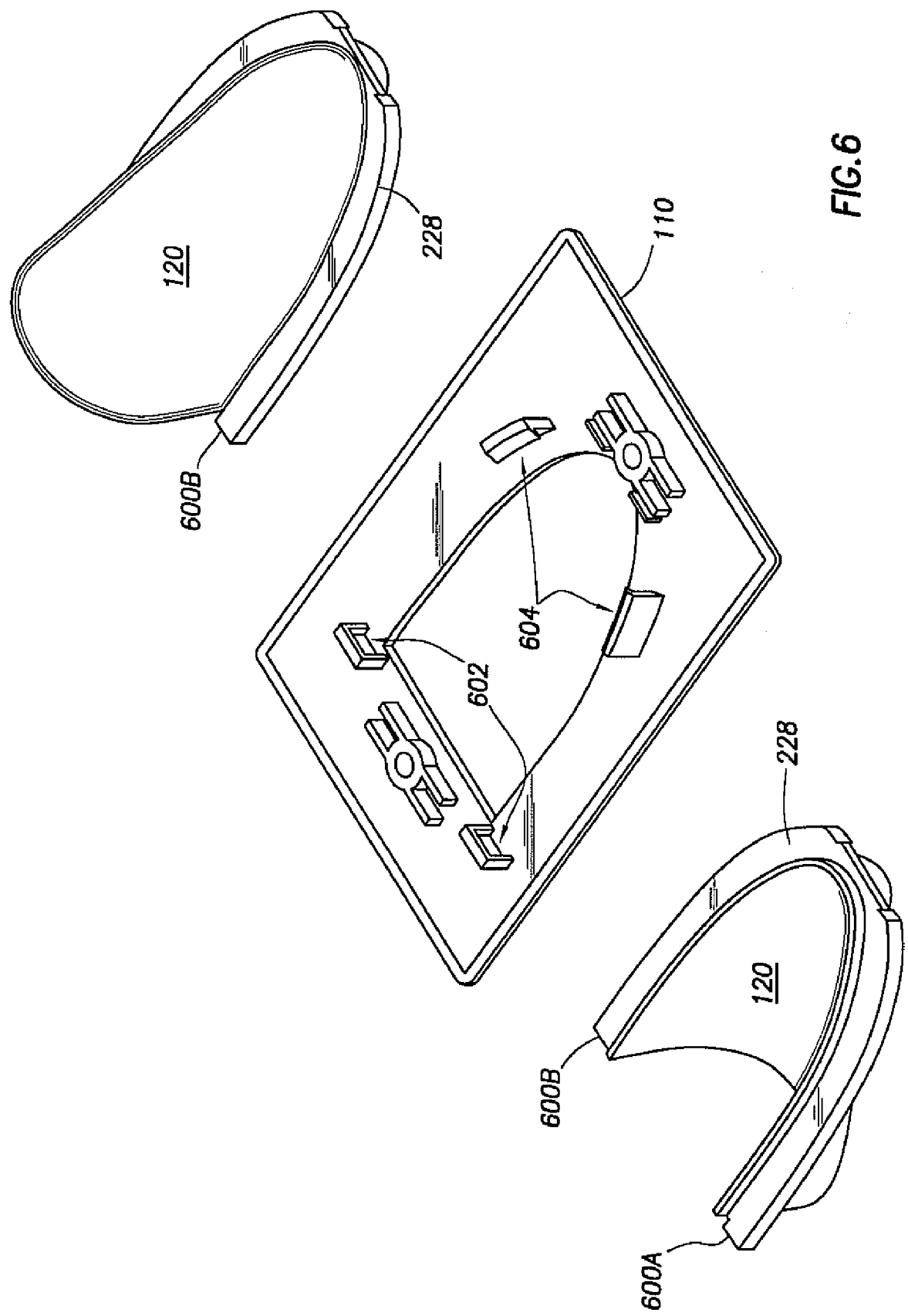
FIG. 6 shows alternative embodiments of attaching the nose portion to the face plate.

FIG. 6 illustrates alternative embodiments of a faceplate system 100 where the nose portion 120 (multiple shown in FIG. 6) couples to the faceplate 110 by fasteners being a snap system. In particular, the nose portion 110 comprises two tabs 600 with slit within slots 602 on the faceplate 110. The tab/slot combination then becomes the point of rotation, and the nose portion 120 is rotated toward the faceplate 110 (with either the nose portion protruding in the direction of the front of the face plate or in the direction of the back of the face plate). The lip 228 mechanically couples to the latches 604, which holds the nose portion 120 in place within the face plate 110.

The above discussion is meant to be illustrative of the principles and various embodiments of the reversible nose faceplate system 100. Numerous variations and modifications will become apparent to those skilled in the art once the above disclosure is fully appreciated. For example, the nose portion 120 may be a single piece of molded plastic or may be formed from multiple pieces of molded plastic that may snap or fit together having the same intended form or function. It is intended that the following claims be interpreted to embrace all such variations and modifications.

What is claimed is:

1. A faceplate system comprising:
   a faceplate having a front side, a back side and a nose aperture, the faceplate configured to removably attach to a surface;
   a nose portion having a top side, a bottom side and a nose edge, the nose portion configured to removably attach to the faceplate in a first configuration such that the nose portion protrudes in the direction of the front side of the faceplate, and a second configuration such that the nose portion protrudes in the direction of the back side of the faceplate; and
   at least one passage at the base of the nose aperture and the nose edge.

2. The faceplate system of claim 1 whereby the surface is a wall.

3. The faceplate system of claim 1 further comprising a fastener configured to couple the faceplate to the surface, and wherein the fastener is at least one selected from the group consisting of: a screw; or a latch mechanism.

4. The faceplate system of claim 1 whereby the nose portion comprises a lip that outlines a portion of the nose portion along the perimeter of the nose portion, the lip configured to removably attach to a socket integrally formed within at least one selected from the group consisting of: the front side of the faceplate; and the back side of the faceplate.

5. The faceplate system of claim 1 whereby the passage is semi-circular and substantially flute-like.

6. The faceplate system of claim 1 whereby the nose edge is substantially semi-circular.

7. The faceplate system of claim 1 whereby the nose aperture is substantially arch shaped.

8. The faceplate system of claim 1 whereby the nose portion is a single piece of molded plastic.

9. The faceplate system of claim 1 whereby the nose portion is constructed of multiple pieces of molded plastic.

10. A method comprising:
   orientating a faceplate having an aperture therein;
   orientating a detachable nose such that the detachable nose protrudes in the direction of the back side of the faceplate;
   aligning the detachable nose with the faceplate; and attaching the detachable nose to the faceplate in the orientation where the detachable nose protrudes in the direction of the back side of the faceplate.

11. The method of claim 10 whereby the aligning the detachable nose with the faceplate further comprises one or more selected from the group consisting of: aligning a lip with the nose aperture and at least one socket integrally formed within the back side of the faceplate; and aligning a tab of the detachable nose with a slot of the faceplate.

12. The method of claim 10 whereby attaching the detachable nose to the faceplate further comprises one or more selected from the group consisting of: attaching the detachable nose via at least one screw; and attaching the detachable nose via at least one latch mechanism.

13. The method of claim 10 further comprising, before attaching the detachable nose to the faceplate, threading at least one wire through the aperture in the faceplate.

14. A reversible nose faceplate system, comprising:
a faceplate having a front side, a back side, and an arch shaped nose aperture, the faceplate configured to removably attach to a surface; and
a reversible nose having a top side, a substantially concave bottom side, a nose edge, and a lip outlining a portion of the bottom side of the nose perimeter, the lip configured to attach to the faceplate in a first orientation such that the reversible nose protrudes in the direction of the front side of the faceplate, and a second orientation such that the reversible nose protrudes in the direction of the back side of the faceplate; and
a passage formed between the base of the arch shaped nose aperture and the nose edge.

15. The reversible nose faceplate system of claim 14 further comprising an audio cable that extends through the passage.

16. The reversible nose faceplate system of claim 14 further comprising a video cable that extends through the passage.

17. The reversible nose faceplate system of claim 14 further comprising a power cable that extends through the passage.

18. An apparatus comprising:
a faceplate that defines a front side, a back side and a nose aperture;
a nose portion that defines a top side, a bottom side and a nose edge, the nose portion configured to attach to the faceplate in a first configuration where the nose extends in the direction of the front side, and a second configuration where the nose extends in the direction of the back side;
a fastener configured to attach the nose portion to the faceplate; and
a passage at the base of the nose aperture and the nose edge.

19. The faceplate system of claim 4 further comprising a fastener configured to removably attach the lip to the socket integrally formed within at least one selected from the group consisting of: the front side of the faceplate; and the back side of the faceplate.

20. A faceplate system comprising:
a faceplate that defines a front side, a back side and a nose aperture, the faceplate configured to removably attach to a surface;
a nose portion that defines a top side and a bottom side, the nose portion couples to the faceplate by a latch that couples over a lip, the latch configured to couple over the lip in a first configuration where the nose portion protrudes in the direction of the front side of the faceplate, and the latch configured to couple over the lip in a second configuration where the nose portion protrudes in the direction of the back side of the faceplate; and
at least one passage defined by the nose portion and the faceplate.

21. The faceplate system as defined in claim 20 wherein the faceplate comprises the latch on the back side of the faceplate, and the nose portion comprises the lip.

22. The faceplate system as defined in claim 20 wherein the nose portion further comprises a tab configured to align the nose portion in the first configuration and the second configuration.

23. The faceplate system as defined in claim 22 wherein the faceplate further comprises a slot configured to align with the tab.

24. An apparatus comprising:
a faceplate that defines a front side, a back side and a nose aperture, the faceplate configured to removably attach to a surface, wherein the back side of the faceplate is configured to abut the surface;
a nose portion that defines a top side, a bottom side, a nose edge and a lip that outlines a portion of the bottom side of a nose perimeter, the nose portion configured to removably attach to the back side of the faceplate such that the nose portion extends in the direction of the back side of the faceplate; and
a passage defined by the nose portion and the faceplate.

25. The apparatus as defined in claim 24 wherein the lip configured to removably attach to a socket integrally formed within the back side of the faceplate.

26. The apparatus as defined in claim 25 further comprising a fastener configured to removably attach the lip to the socket, the fastener integrally formed on the back side of the faceplate.

27. The apparatus as defined in claim 24 further comprising a latch integrally formed on the back side of the faceplate, the latch configured to removably snap the nose portion to the back side of the face plate.

* * * * *